US009452937B2

United States Patent
Elomari et al.

(10) Patent No.: US 9,452,937 B2
(45) Date of Patent: Sep. 27, 2016

(54) SYNTHESIS OF ALUMINOSILICATE MOLECULAR SIEVES HAVING THE IFR STRUCTURE TYPE

(71) Applicants: Saleh Ali Elomari, Fairfield, CA (US); Timi Pravin Singa, San Francisco, CA (US)

(72) Inventors: Saleh Ali Elomari, Fairfield, CA (US); Timi Pravin Singa, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 172 days.

(21) Appl. No.: 14/586,662

(22) Filed: Dec. 30, 2014

(65) Prior Publication Data

US 2016/0185610 A1 Jun. 30, 2016

(51) Int. Cl.
| | | |
|---|---|---|
| *C01B 39/48* | (2006.01) | |
| *B01J 29/70* | (2006.01) | |
| *C01B 39/46* | (2006.01) | |

(52) U.S. Cl.
CPC .............. *C01B 39/48* (2013.01); *B01J 29/70* (2013.01); *C01B 39/46* (2013.01)

(58) Field of Classification Search
CPC .......... C01B 39/46; C01B 39/48; B01J 29/70
See application file for complete search history.

(56) References Cited

U.S. PATENT DOCUMENTS

| | | | |
|---|---|---|---|
| 4,503,024 A * | 3/1985 | Bourgogne | C01B 33/2869 423/709 |
| 5,340,563 A * | 8/1994 | Zones | B01J 29/70 423/328.2 |
| 5,437,855 A | 8/1995 | Valyocsik | |
| 5,441,721 A | 8/1995 | Valyocsik | |
| 5,653,956 A | 8/1997 | Zones | |
| 5,770,175 A | 6/1998 | Zones | |
| 6,821,502 B2 | 11/2004 | Elomari et al. | |
| 7,208,137 B2 | 4/2007 | Elomari et al. | |
| 8,007,763 B2 | 8/2011 | Zones | |
| 2007/0104643 A1 * | 5/2007 | Holland | B01J 29/40 423/700 |
| 2016/0185610 A1 * | 6/2016 | Elomari | C01B 39/48 423/706 |

FOREIGN PATENT DOCUMENTS

WO 98/29332 7/1998

OTHER PUBLICATIONS

M.A. Camblor, A. Corma and L.A. Villaescusa "ITQ-4: A New Large Pore Microporous Polymorph of Silica" Chem. Commun. 1997, 749-750.
C.Y. Chen, L.W. Finger, R.C. Medrud, P.A. Crozier, I.Y. Chan, T.V. Harris and S.I. Zones "SSZ-42: the first high-silica large pore zeolite with an undulating, one-dimensional channel system" Chem. Commun. 1997, 1775-1776.

(Continued)

*Primary Examiner* — David M Brunsman
(74) *Attorney, Agent, or Firm* — Terrence M. Flaherty

(57) ABSTRACT

This disclosure is directed to a method for directly preparing pure phase aluminosilicate molecular sieves having the IFR framework type using a colloidal aluminosilicate composition in the presence of N-benzyl-4-aza-1-azoniabicyclo[2.2.2]octane cations as a structure directing agent.

6 Claims, 3 Drawing Sheets

(56) References Cited

OTHER PUBLICATIONS

C.Y. Chen, L.W. Finger, R.C. Medrud, C.L. Kibby, P.A. Crozier, I.Y. Chan, T.V. Harris, L.W. Beck and S. I. Zones "Synthesis, Structure, and Physicochemical and Catalytic Characterization of the Novel High-Silica Large-Pore Zeolite SSZ-42" Chem. Eur. J. 1998, 4, 1312-1323.

C.Y. Chen, S.I. Zones, L.T. Yuen, T.V. Harris and S.A. Elomari "Factors Influencing the Synthesis of Novel Large Pore Zeolite SSZ-42 and Its Subsequent Characterization" Proc. 12th Intern. Zeolite Conf., Baltimore, USA, 1998, 1945-1952.

\* cited by examiner

SYNTHESIS OF ALUMINOSILICATE MOLECULAR SIEVES HAVING THE IFR STRUCTURE TYPE

TECHNICAL FIELD

This disclosure relates generally to methods for preparing pure phase aluminosilicate molecular sieves having the IFR structure type using a colloidal aluminosilicate composition in the presence of N-benzyl-4-aza-1-azoniabicyclo[2.2.2]octane cations as a structure directing agent.

BACKGROUND

Molecular sieve materials, both natural and synthetic, have been demonstrated in the past to be useful as adsorbents and to have catalytic properties for various types of hydrocarbon conversion reactions. Certain molecular sieves, zeolites, aluminophosphates, mesoporous materials, are ordered, porous crystalline materials having a definite crystalline structure as determined by X-ray diffraction (XRD). Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three letter code and are described in the "*Atlas of Zeolite Framework Types,*" Sixth Revised Edition, Elsevier, 2007.

One known molecular sieve for which a structure has been established is the material designated as IFR, which is a molecular sieve having an undulating, one-dimensional 12-membered channel system. Examples of IFR framework type molecular sieves include ITQ-4, MCM-58 and SSZ-42.

PCT Publication No. WO98/29332 discloses ITQ-4 and its synthesis in a fluoride medium using N-benzylquinuclidinium cations or N-benzyl-1,4-diazabicyclo[2.2.2]octane cations as a structure directing agent.

U.S. Pat. No. 5,437,855 discloses MCM-58 and its synthesis in the presence of N-benzylquinuclidinium cations as a structure directing agent. U.S. Pat. No. 5,441,721 discloses the synthesis of MCM-58 using N-benzyltropanium cations as a structure directing agent.

U.S. Pat. No. 5,653,956 discloses SSZ-42 and its synthesis using N-benzyl-1,4-diazabicyclo[2.2.2]octane cations or N-benzyl-1-azabicyclo[2.2.2]octane cations as a structure directing agent. The SSZ-42 can contain oxides of boron, aluminum, gallium, iron or titanium, but at least 50% of those oxides must be boron oxide. In Example 14, an aluminum-containing SSZ-42 is made, but the aluminum is added to the SSZ-42 by post-synthetic treatment of the boron-containing SSZ-42.

U.S. Pat. No. 6,821,502 discloses the direct synthesis of aluminosilicate IFR framework type materials using a zeolite as the source of aluminum, a separate source of silicon, and a structure directing agent selected from N-benzylquinuclidinium cations and N-benzyl-1,4-diazabicyclo[2.2.2]octane cations.

Attempts to grow pure phase aluminosilicate IFR framework type crystals have been problematic, typically resulting in the formation of undesired impurities. The typical impurities found in the synthesized products include, for example, unreacted source zeolite and the competitive phases of beta zeolite, mordenite and/or ZSM-12, which can be identified in X-ray diffraction patterns.

The preparation of aluminosilicate IFR framework type molecular sieves using colloidal aluminosilicate compositions as a source of aluminum and silicon has not been previously reported. The present disclosure is based on the discovery that the preparation of aluminosilicate IFR framework type molecular sieves from a synthesis mixture containing a colloidal aluminosilicate composition allows for the preparation of aluminosilicate IFR framework type molecular sieve crystals free of impurities.

SUMMARY

In one aspect, there is provided a method of preparing an aluminosilicate molecular sieve having the IFR framework type by contacting under crystallization conditions (1) a colloidal aluminosilicate composition; (2) at least one source of an element selected from Groups 1 and 2 of the Periodic Table; (3) N-benzyl-4-aza-1-azoniabicyclo[2.2.2]octane cations; and (4) hydroxide ions.

In another aspect, there is provided a process for preparing an aluminosilicate type molecular sieve having the IFR framework type by: (a) preparing a reaction mixture containing (1) a colloidal aluminosilicate composition; (2) at least one source of an element selected from Groups 1 and 2 of the Periodic Table; (3) N-benzyl-4-aza-1-azoniabicyclo[2.2.2]octane cations; (4) hydroxide ions; and (5) water; and (b) subjecting the reaction mixture to crystallization conditions sufficient to form crystals of the molecular sieve.

The present disclosure also provides an aluminosilicate molecular sieve having the IFR framework type and having a composition, as-synthesized and in the anhydrous state, in terms of mole ratios, as follows:

|  | Broad | Exemplary |
| --- | --- | --- |
| $SiO_2/Al_2O_3$ | 5 to 200 | 15 to 100 |
| $Q/SiO_2$ | 0.02 to 0.20 | 0.05 to 0.15 |
| $M/SiO_2$ | 0.01 to 0.20 | 0.05 to 0.20 | wherein (1) Q is an N-benzyl-4-aza-1-azoniabicyclo[2.2.2]octane cation and (2) M is selected from the group consisting of elements from Groups 1 and 2 of the Periodic Table.

DETAILED DESCRIPTION

Introduction

Figure 1:
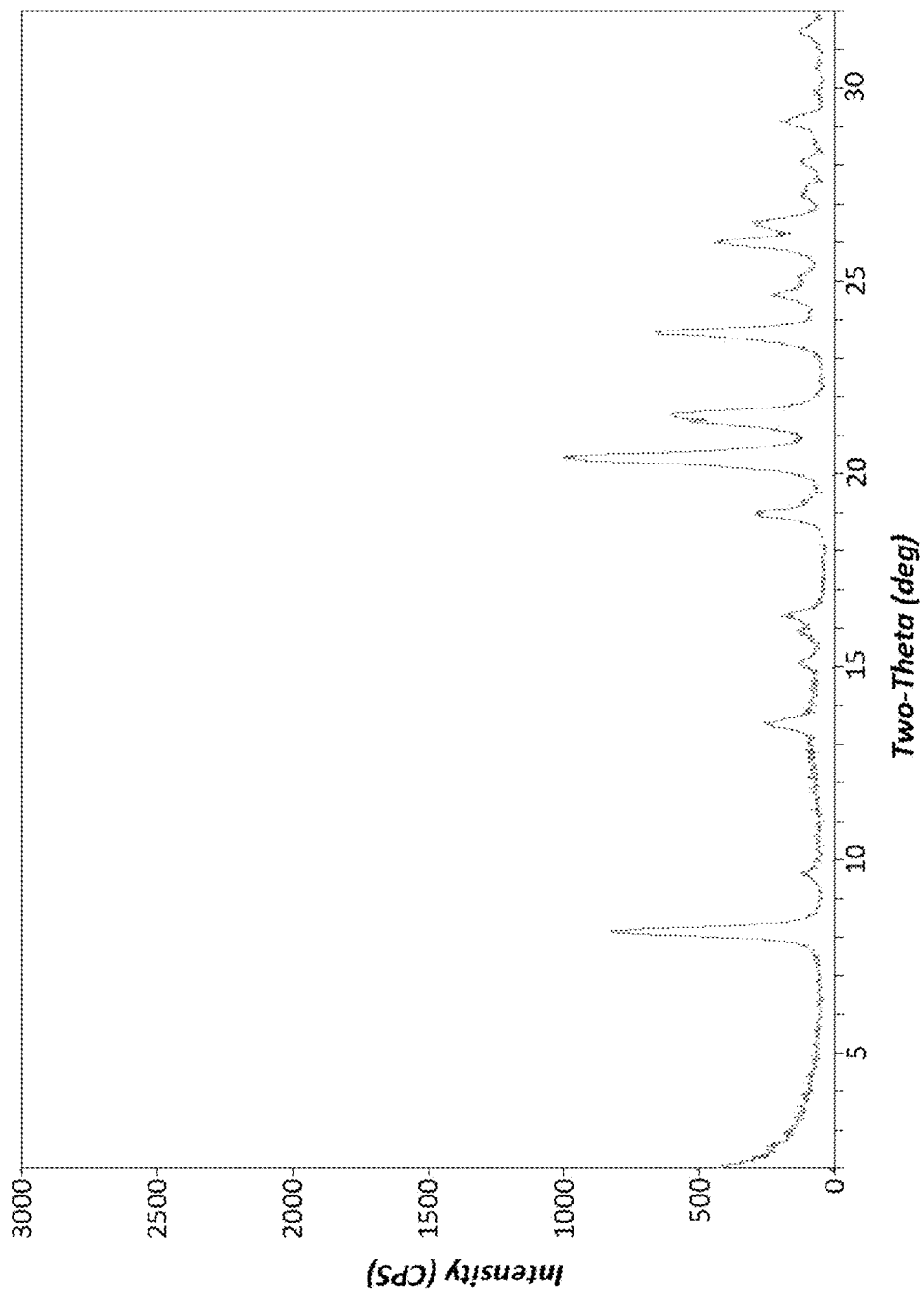
FIG. 1 shows the powder X-ray diffraction (XRD) pattern of the as-synthesized zeolite product of Example 1.

The following terms will be used throughout the specification and will have the following meanings unless otherwise indicated.

The term "framework type" is used in the sense described in the "*Atlas of Zeolite Framework Types,*" Sixth Revised Edition, Elsevier, 2007.

The term "colloid" and other like terms including "colloidal," "sol," and the like refer to a two-phase system having a dispersed phase and a continuous phase. The colloids disclosed herein have a solid phase dispersed or suspended in a continuous or substantially continuous liquid phase, typically an aqueous solution. Thus, the term "colloid" encompasses both phases, whereas "colloidal particles" or "particles" refer to the dispersed or solid phase.

As used herein, the numbering scheme for the Periodic Table Groups is as disclosed in *Chem. Eng. News,* 63(5), 27 (1985).

In preparing the aluminosilicate IFR framework type molecular sieves disclosed herein, an N-benzyl-4-aza-1-azoniabicyclo[2.2.2]octane cation ("benzyl DABCO") is used as the structure directing agent ("SDA"), also known as a crystallization template. The SDA useful for making the zeolite is represented by the following structure (1):

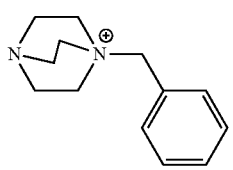

(1)

N-benzyl-4-aza-1-azoniabicyclo[2.2.2]octane cation

The SDA cation is associated with anions which can be any anion that is not detrimental to the formation of the molecular sieve. Representative anions include elements from Group 17 of the Periodic Table (e.g., fluoride, chloride, bromide and iodide), hydroxide, sulfate, tetrafluoroborate, acetate, carboxylate, and the like.

Reaction Mixture

In general, the aluminosilicate molecular sieve having the IFR framework type is prepared by: (a) preparing a reaction mixture containing (1) a colloidal aluminosilicate composition; (2) at least one source of an element selected from Groups 1 and 2 of the Periodic Table; (3) N-benzyl-4-aza-1-azoniabicyclo[2.2.2]octane cations; (4) hydroxide ions; and (5) water; and (b) subjecting the reaction mixture to crystallization conditions sufficient to form crystals of the molecular sieve.

The composition of the reaction mixture from which the molecular sieve is formed, in terms of mole ratios, is identified in Table 1 below:

TABLE 1

| Components | Broad | Exemplary |
|---|---|---|
| $SiO_2/Al_2O_3$ | 5 to 200 | 15 to 100 |
| $M/SiO_2$ | 0.01 to 0.50 | 0.05 to 0.25 |
| $Q/SiO_2$ | 0.05 to 0.50 | 0.10 to 0.25 |
| $OH/SiO_2$ | 0.05 to 0.50 | 0.10 to 0.30 |
| $H_2O/SiO_2$ | 15 to 100 | 20 to 50 | wherein compositional variables M and Q are as described herein above.

The sources of aluminum and silicon for the reaction mixture comprise a colloidal aluminosilicate composition. Colloidal aluminosilicate compositions useful in the process described herein, as well as methods of making the colloidal aluminosilicates, are disclosed in U.S. Patent Application Publication No. 2007/0104643. Colloidal aluminosilicate compositions are also commercially available from suppliers such as Nalco (Naperville, Ill.).

As described herein above, for each embodiment described herein, the reaction mixture can be formed using at least one source of an element selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, acetates, oxalates and citrates thereof.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

In practice, the molecular sieve is prepared by: (a) preparing a reaction mixture as described herein above; and (b) subjecting the reaction mixture to crystallization conditions sufficient to form crystals of the molecular sieve (see, e.g., H. Robson, "*Verified Syntheses of Zeolitic Materials,*" Second Revised Edition, Elsevier, 2001).

The reaction mixture is maintained at an elevated temperature until the crystals of the molecular sieve are formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step.

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. Seeds can typically be present in an amount of from 0.01 to 10,000 wppm (e.g., from 10 to 1,000 wppm) of the overall reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by the skilled artisan sufficient to remove the SDA from the molecular sieve. The SDA can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

The molecular sieve can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion exchange and replace it with hydrogen, ammonium, or any desired metal-ion.

Characterization of the Molecular Sieve

The IFR framework type molecular sieves made by the process disclosed herein have a composition (in terms of mole ratios), as-synthesized and in the anhydrous state, as described in Table 2 below:

TABLE 2

|  | Broad | Exemplary |
|---|---|---|
| $SiO_2/Al_2O_3$ | 5 to 200 | 15 to 100 |
| $Q/SiO_2$ | 0.02 to 0.20 | 0.05 to 0.15 |
| $M/SiO_2$ | 0.01 to 0.20 | 0.05 to 0.20 | wherein compositional variables Q and M are as described herein above.

The IFR framework type molecular sieves prepared in accordance with this disclosure are characterized by their X-ray diffraction pattern. X-ray diffraction patterns representative of IFR framework type molecular sieves can be referenced in the "*Collection of Simulated XRD Powder Patterns for Zeolites*," Fifth Revised Edition, Elsevier, 2007 of the International Zeolite Association. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

The crystalline IFR framework type molecular sieve prepared in accordance with this disclosure is preferably substantially free of non-IFR framework type material. By "substantially free of non-IFR framework type material" is meant that the composition does not contain non-IFR framework type phases, as measured by X-ray diffraction. The presence of these impurities can be determined and quantified by analysis of the X-ray diffraction pattern of a sample. The term "non-IFR framework type material" used herein means any material does not contain crystalline molecular sieve of the IFR framework type. Examples of such non-IFR framework material are amorphous material, Y and X zeolites (FAU framework type), gismondine (GIS framework type), mordenite (MOR framework type), and ZSM-12 (MTW framework type). The non-IFR framework type material can co-crystallize with the IFR framework type material or mix with the IFR framework type material.

EXAMPLES

The following illustrative examples are intended to be non-limiting.

Example 1

Synthesis of Aluminosilicate SSZ-42 (Al-SSZ-42)

In a 23 cc Teflon liner, 2.4 g of a 0.95M aqueous solution of benzyl DABCO, 3 g of a 1N KOH solution, and 5.3 g of a colloidal aluminosilicate (Nalco, 19 wt. % solids, $SiO_2$/$Al_2O_3$ mole ratio=35) were mixed into a homogenized solution. The liner was closed and placed in an autoclave and sealed. The autoclave was placed in a rotating spit (43 rpm) in an oven and heated at 170° C. for 5 days. Analysis of the thick paste (pH=11.3) by SEM and XRD indicated reaction completion. The reaction mixture was filtered in a fritted-glass funnel. The solids were rinsed thoroughly with water and rinsed once with 10 mL of acetone to remove organic residuals. The obtained sample was left to dry in air for about 1 hour and then dried in an oven at 125° C. to yield 1.2 g of the as-synthesized molecular sieve.

Figure 2:
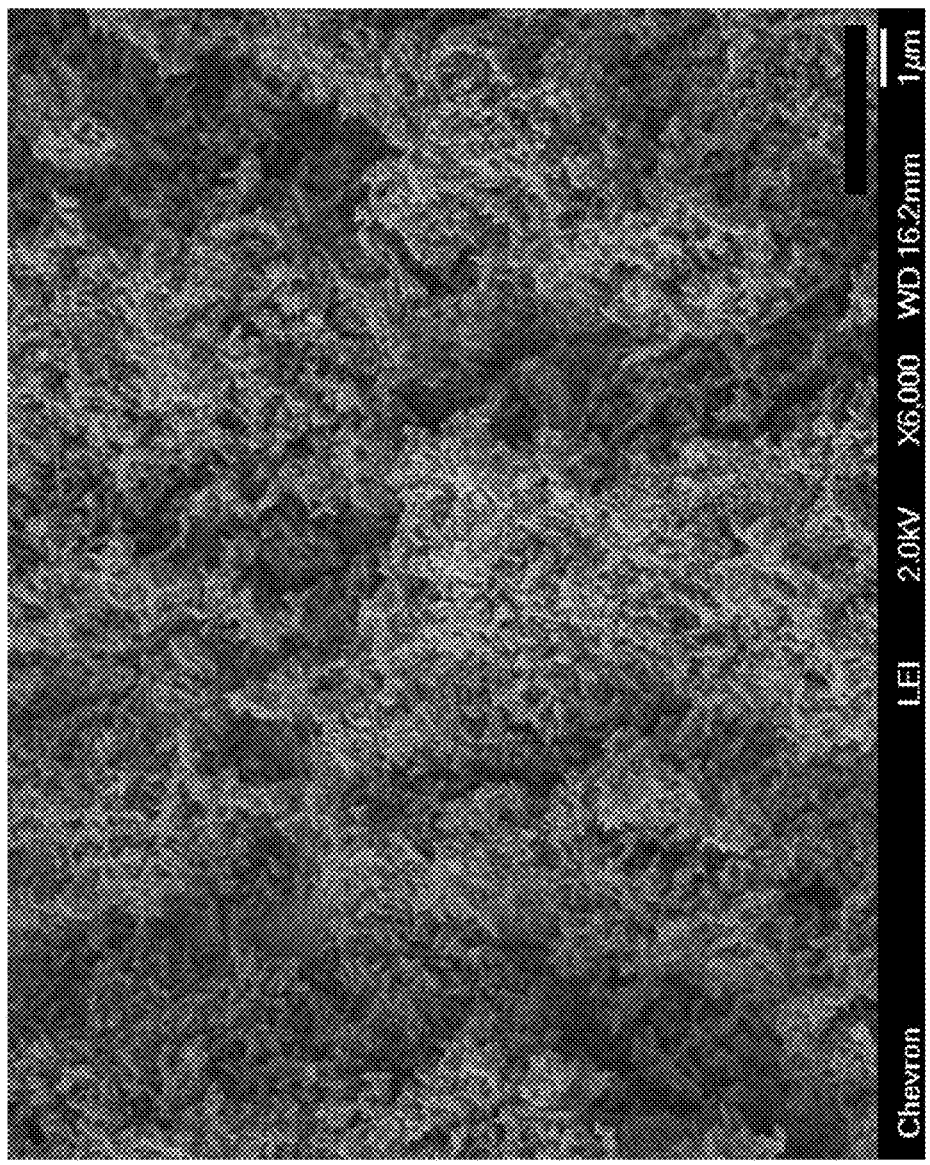
FIG. 2 shows a Scanning Electron Micrograph (SEM) of the as-synthesized zeolite product of Example 1.

The resulting product was analyzed by powder XRD and SEM. FIG. 1 is the powder XRD pattern of the product, which showed the product to be pure phase SSZ-42 with no trace of any impurities. FIG. 2 shows a SEM image of the product.

The as-synthesized material had an X-ray diffraction pattern including the most significant lines as set forth in Table 3 below.

TABLE 3

| 2-Theta | d-Spacing, nm | Relative Intensity (%) |
|---|---|---|
| 8.14 | 1.085 | 68.2 |
| 13.58 | 0.653 | 15.4 |
| 16.30 | 0.543 | 21.2 |
| 18.98 | 0.467 | 27.8 |
| 20.46 | 0.434 | 100.0 |
| 21.54 | 0.412 | 73.6 |
| 23.68 | 0.375 | 57.9 |
| 24.62 | 0.361 | 26.0 |
| 25.12 | 0.354 | 18.4 |
| 25.98 | 0.343 | 44.2 |
| 26.52 | 0.336 | 34.0 |
| 25.14 | 0.255 | 15.7 |
| 35.82 | 0.250 | 19.4 |

Example 2

Synthesis of Al-SSZ-42

In a 125 cc Teflon liner, 17 g of 0.95M aqueous solution of benzyl DABCO, 21 g of 1N KOH solution, and 36 g of colloidal aluminosilicate (Nalco, 19 wt. % solids, $SiO_2$/$Al_2O_3$ mole ratio=35) were mixed into a homogeneous gel. The liner was closed and placed in an autoclave and sealed. The autoclave was placed on a rotating spit (43 rpm) in an oven and heated at 170° C. for 5 days. Analysis of the thick white gel (pH=11.4) by SEM and XRD indicated completion of the reaction. The reaction mixture was filtered in a fritted-glass funnel. The solids were rinsed thoroughly with water and rinsed once with 20 mL of acetone to remove organic residuals. The obtained sample was left to dry in air for about 1 hour and then dried in an oven at 125° C. until completely dry to yield 8.4 g of the as-synthesized molecular sieve.

XRD analysis of the as-synthesized material indicated that the product was pure phase Al-SSZ-42 with no trace of any impurities.

Example 3

Seeded Synthesis of Al-SSZ-42

Example 2 was repeated except that 0.5 g of Al-SSZ-42 from a previous synthesis was added to the reaction mixture as seeds. The reaction mixture afforded 8.6 g of pure phase Al-SSZ-42 (as determined by powder XRD) after heating for 3 days.

Example 4

Calcination of Al-SSZ-42

The as-synthesized product of Example 1 was calcined in air in a calcination oven by gradually heating the oven at a rate of 1° C./minute to 120° C. and kept there for 2 hours. The temperature was then gradually ramped up at a rate of 1° C./minute to 540° C. and held at that temperature for 5 hours. Then, the temperature was ramped up at a rate of 1° C./minute to 595° C. and held at that temperature for 5 hours. Upon calcination, the sample lost about 15 wt. % which is typical for SSZ-42.

Figure 3:
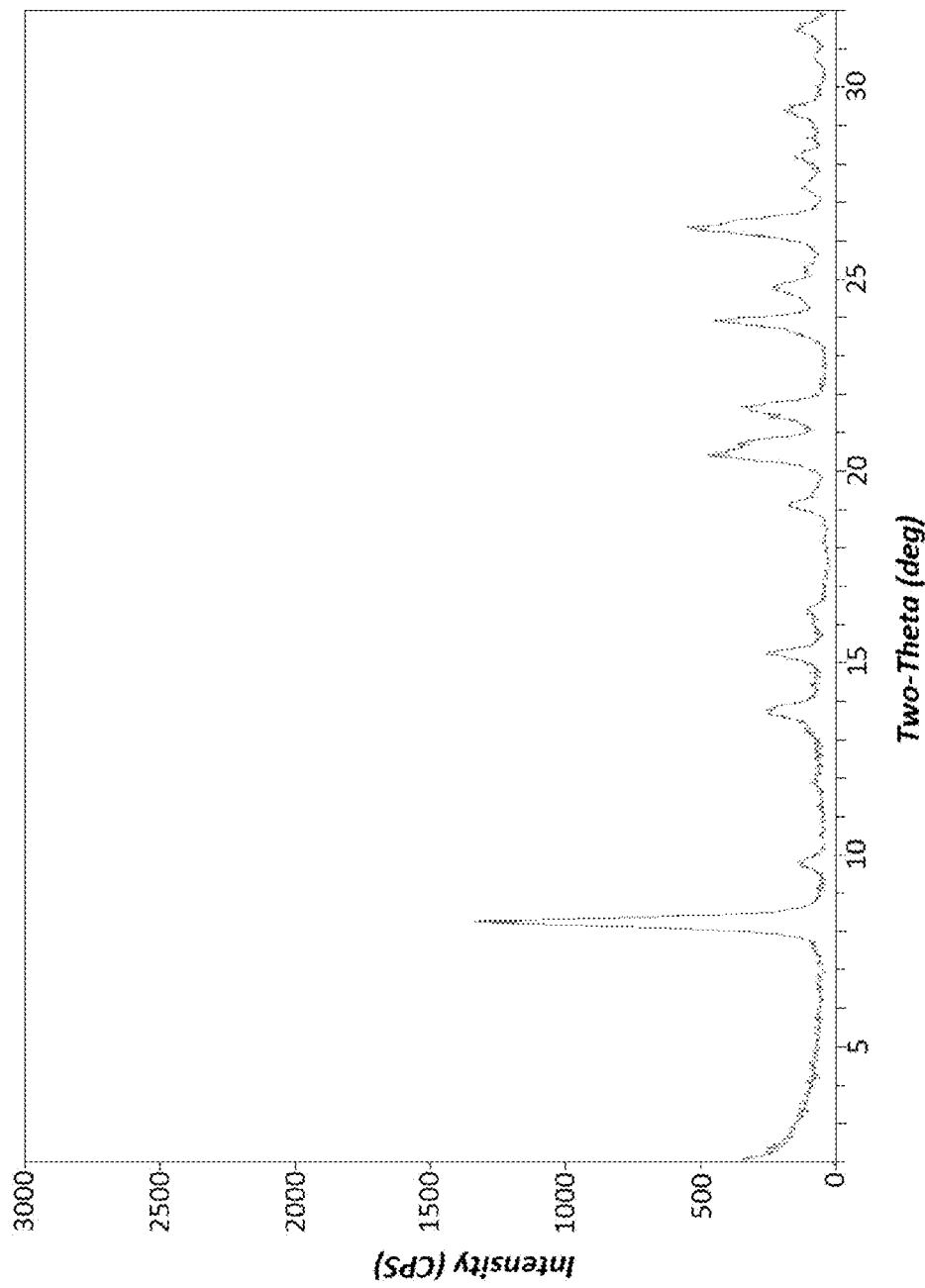
FIG. 3 shows the powder XRD pattern of the calcined zeolite product of Example 4.

The resultant calcined material was analyzed by powder XRD. FIG. 3 is the powder XRD pattern of the calcined product.

The calcined material had an X-ray diffraction pattern including the most significant lines as set forth in Table 4 below and shows that the material retained its crystallinity after calcination.

TABLE 4

| 2-Theta | d-Spacing, nm | Relative Intensity (%) |
|---|---|---|
| 8.26 | 1.069 | 100.0 |
| 13.78 | 0.642 | 20.6 |
| 19.08 | 0.465 | 15.1 |
| 20.42 | 0.435 | 54.2 |
| 21.68 | 0.410 | 33.9 |
| 23.92 | 0.372 | 35.5 |
| 24.80 | 0.359 | 30.3 |
| 26.36 | 0.338 | 52.9 |
| 29.40 | 0.304 | 18.7 |
| 36.04 | 0.249 | 24.0 |
| 36.58 | 0.245 | 15.5 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing an aluminosilicate molecular sieve having the IFR framework type, comprising:
   (a) preparing a reaction mixture containing:
      (1) a colloidal aluminosilicate composition;
      (2) at least one source of an element selected from Groups 1 and 2 of the Periodic Table;
      (3) N-benzyl-4-aza-1-azoniabicyclo[2.2.2]octane cations;
      (4) hydroxide ions; and
      (5) water; and
   (b) subjecting the reaction mixture to crystallization condition sufficient to form crystals of the molecular sieve.

2. The method of claim 1, wherein the molecular sieve is prepared from a reaction mixture comprising, in terms of mole ratios, the following:

| | |
|---|---|
| $SiO_2/Al_2O_3$ | 5 to 200 |
| $M/SiO_2$ | 0.01 to 0.50 |
| $Q/SiO_2$ | 0.05 to 0.50 |
| $OH/SiO_2$ | 0.05 to 0.50 |
| $H_2O/SiO_2$ | 15 to 100 | wherein:
   (1) M is selected from the group consisting of elements from Groups 1 and 2 of the Periodic Table; and
   (2) Q is an N-benzyl-4-aza-1-azoniabicyclo[2.2.2]octane cation.

3. The method of claim 1, wherein the molecular sieve is prepared from a reaction comprising, in terms of mole ratios, the following:

| | |
|---|---|
| $SiO_2/Al_2O_3$ | 15 to 100 |
| $M/SiO_2$ | 0.05 to 0.25 |
| $Q/SiO_2$ | 0.10 to 0.25 |
| $OH/SiO_2$ | 0.10 to 0.30 |
| $H_2O/SiO_2$ | 20 to 50 | wherein:
   (1) M is selected from the group consisting of elements from Groups 1 and 2 of the Periodic Table; and
   (2) Q is an N-benzyl-4-aza-1-azoniabicyclo[2.2.2]octane cation.

4. The method of claim 1, wherein the molecular sieve has a composition, as-synthesized and in the anhydrous state, in terms of mole ratios, as follows:

| | |
|---|---|
| $SiO_2/Al_2O_3$ | 5 to 200 |
| $Q/SiO_2$ | 0.02 to 0.20 |
| $M/SiO_2$ | 0.01 to 0.20 | wherein:
- (1) Q is an N-benzyl-4-aza-1-azoniabicyclo[2.2.2]octane cation; and
- (2) M is selected from the group consisting of elements from Groups 1 and 2 of the Periodic Table.

5. The method of claim 1, wherein the molecular sieve has a composition, as-synthesized and in the anhydrous state, in terms of mole ratios, as follows:

| | |
|---|---|
| $SiO_2/Al_2O_3$ | 15 to 100 |
| $Q/SiO_2$ | 0.05 to 0.15 |
| $M/SiO_2$ | 0.05 to 0.20 | wherein:
- (1) Q is an N-benzyl-4-aza-1-azoniabicyclo[2.2.2]octane cation; and
- (2) M is selected from the group consisting of elements from Groups 1 and 2 of the Periodic Table.

6. The method of claim 1, wherein the molecular sieve is substantially free of non-IFR framework type material.

* * * * *